US009635836B2

(12) United States Patent
Weinberg et al.

(10) Patent No.: US 9,635,836 B2
(45) Date of Patent: May 2, 2017

(54) FORMED JERKY TREATS FORMULATION AND METHOD

(75) Inventors: Brett Weinberg, San Clemente, CA (US); Lucas Saxe, Laguna Beach, CA (US)

(73) Assignee: Nestec Ltd, Vevey (CH)

( * ) Notice: Subject to any disclaimer, the term of this patent is extended or adjusted under 35 U.S.C. 154(b) by 563 days.

(21) Appl. No.: 13/196,813

(22) Filed: Aug. 2, 2011

(65) Prior Publication Data

US 2012/0082762 A1    Apr. 5, 2012

Related U.S. Application Data

(60) Provisional application No. 61/388,144, filed on Sep. 30, 2010, provisional application No. 61/489,591, filed on May 24, 2011.

(51) Int. Cl.

| A01K 15/02 | (2006.01) |
|---|---|
| A23K 40/00 | (2016.01) |
| A23K 40/20 | (2016.01) |
| A23K 10/20 | (2016.01) |
| A23K 50/40 | (2016.01) |

(52) U.S. Cl.
CPC ............ *A01K 15/026* (2013.01); *A23K 10/20* (2016.05); *A23K 40/00* (2016.05); *A23K 40/20* (2016.05); *A23K 50/40* (2016.05)

(58) Field of Classification Search
CPC ........ A23K 1/1846; A23K 1/10; A23K 1/001; A23K 1/003; A23K 40/20; A23K 10/20; A23K 50/40; A23K 40/00; A01K 1/001; A01K 1/003; A01K 15/026
USPC ....... 426/641, 644, 646, 273, 237, 331, 335, 426/805
See application file for complete search history.

(56) References Cited

U.S. PATENT DOCUMENTS

| 1,950,763 | A | * | 3/1934 | Walter | .................. | A23B 4/068 |
|---|---|---|---|---|---|---|
| | | | | | | 100/265 |
| 3,100,710 | A | * | 8/1963 | Carlin | ........................... | 426/104 |
| 4,000,319 | A | * | 12/1976 | Eichelburg | ....................... | 426/2 |
| 4,384,009 | A | * | 5/1983 | Lewis et al. | ................... | 426/646 |
| 4,743,461 | A | * | 5/1988 | Gellman | ................ | A23K 1/003 |
| | | | | | | 426/549 |
| 4,910,038 | A | * | 3/1990 | Ducharme | .................... | 426/641 |
| 5,234,372 | A | * | 8/1993 | Hutchison | ..................... | 452/172 |
| 5,290,584 | A | * | 3/1994 | Ray | ................................ | 426/637 |
| 5,731,029 | A | * | 3/1998 | Karwowski et al. | ......... | 426/646 |
| 6,238,726 | B1 | * | 5/2001 | Fischer | .................. | A23K 40/20 |
| | | | | | | 426/644 |

(Continued)

FOREIGN PATENT DOCUMENTS

| KR | 2006097424 | A | * | 9/2006 |
|---|---|---|---|---|
| WO | WO 9305666 | A1 | * | 4/1993 |

OTHER PUBLICATIONS

International Search Report and Written Opinion in PCT Application No. PCT/US 11/54342, mailed Apr. 13, 2012, in 15 pgs.

(Continued)

*Primary Examiner* — Chhaya Sayala
(74) *Attorney, Agent, or Firm* — Julie M. Lappin

(57) ABSTRACT

Pet treats and methods of manufacturing pet treats comprising unprocessed meats are disclosed. The unprocessed meats are not extruded, ground, emulsified, liquefied, partially liquefied, or made into a powder. The unprocessed meats may be combined with natural and/or un-natural binding agents and may also be combined with natural and/or un-natural preservatives. The combination may be formed into shapes in which the pieces, bits, and/or parts of the unprocessed meat may, or may not, be visible within the production product, yet contained within.

21 Claims, 3 Drawing Sheets

(56) References Cited

U.S. PATENT DOCUMENTS

| | | | |
|---|---|---|---|
| 7,914,835 B2* | 3/2011 | Keehn | A01K 15/026 426/2 |
| 2006/0188611 A1 | 8/2006 | Unlu et al. | |
| 2008/0020117 A1* | 1/2008 | Lombard et al. | 426/541 |
| 2008/0145485 A1* | 6/2008 | Tepper | A23K 10/20 426/92 |
| 2008/0181987 A1* | 7/2008 | Lusby et al. | 426/62 |
| 2008/0185746 A1* | 8/2008 | Axelrod et al. | 264/37.27 |
| 2009/0232939 A1* | 9/2009 | Berge | 426/56 |
| 2009/0311390 A1 | 12/2009 | Phelps et al. | |

OTHER PUBLICATIONS

"Canyon Creek Ranch™ Western Chicken Chips" product, on sale in the United States before the priority date of the present application, Sep. 30, 2010.

"Purina® Carvers® Roasted Slices for Dogs" product, on sale in the United States before the priority date of the present application, Sep. 30, 2010.

"Waggin' Train® Wholesome Chicken Jerky Tenders®" product, on sale in the United States before the priority date of the present application, Sep. 30, 2010.

"Canyon Creek Ranch® Crunchy & Delicious Chicken Poppers" product, on sale in the United States before the priority date of the present application, Sep. 30, 2010.

"Canyon Creek Ranch™ Natural Chicken Stix" product, on sale in the United States before the priority date of the present application, Sep. 30, 2010.

"VitaLife® Chicken & Rice Recipe Poppers" product, on sale in the United States before the priority date of the present application, Sep. 30, 2010.

"Dingo Munchy Stix™ Chicken in the Middle!™" product, on sale in the United States before the priority date of the present application, Sep. 30, 2010.

\* cited by examiner

FORMED JERKY TREATS FORMULATION AND METHOD

RELATED APPLICATIONS

This application claims the benefit of U.S. Provisional Patent Application Ser. Nos. 61/388,144, filed Sep. 30, 2010, and 61/489,591, filed May 24, 2011, the entire contents of which are incorporated herein by reference.

BACKGROUND

Field of the Invention

The invention disclosed herein relates generally to the field of manufacturing and formulating pet treats. More specifically, the invention relates to pet treats and methods of manufacturing pet treats comprising unprocessed meats that have not been extruded, ground, emulsified, liquefied, partially liquefied, or made into a powder.

Description of the Related Art

Traditionally, jerky-based pet treat products combine dried meats of poultry, mammal, rodent, or swine origin with preserving agents to be sold as pet treats. An example of such a jerky product is shown in FIG. 1A. Jerky products are also available where these dried meats are wrapped around or are placed inside of other forms of treats like biscuits, rawhide or dried meats, as shown in FIGS. 1B and 1C.

For extruded meat-based pet treats, many treats do not have a meat content comprising the majority of the treat, but some extruded treats may have a meat content in excess of 80% of the total weight of the product before water is removed. These ingredients are heated into uniform slurries that are then extruded into shapes. These shapes do not visibly show the meat as the product becomes uniform in texture and shape, as shown in FIGS. 1D and 1E.

For extruded meat-based pet treats that include chicken, chicken is processed using one or more of several methods. For example, chicken may be emulsified, turned into a liquid, and/or processed into a semi-liquid and combined—or not combined—with any number of ingredients, such as rice. Chicken may also be baked, broken down into a powder, and then mixed with other ingredients. The processed chicken and other ingredients, if included, are then extruded into shapes. Then the shape can be dried and hardened as is, or additional manufacturing processes like boiling can be employed to give the product a smooth texture. Each of these processes changes the natural state of the chicken and causes the chicken to lose its unique texture and feel, as shown in FIG. 1F. In addition, during these processes, many key nutrients are lost.

In extruded meat-based pet treats, ground up regrinds of rawhide production are often combined with a small amount of chicken bits and chicken powder and then extruded into stick based chews for dogs. These products are primarily sold in the chew set with rawhide, yet may appear with treats or other products. Often, these products are mostly rawhide, including over 90% rawhide. An example of such a product is shown in FIG. 1G.

For pressed chicken pet treats, chicken is processed using one or more of several methods. For example, chicken may be emulsified, turned into a liquid, and/or processed into a semi-liquid and combined—or not combined—with any number of ingredients, such as rice. Chicken may also be baked, broken down into a powder, and then mixed with other ingredients. The processed chicken and other ingredients, if included, are then formed into shapes by pressing them into a mold or hand molding them. The shape can be dried and hardened as is, or additional manufacturing processes like boiling can be employed to give the product a smooth texture. Each of these processes changes the natural state of the chicken and causes the chicken to lose its unique texture and feel, as shown in FIGS. 1D and 1E. In addition, during these processes, many key nutrients are lost.

For pressed chicken pet treats, ground up regrinds of rawhide production are often combined with a small amount of chicken bits and chicken powder and then extruded into shape based chews for dogs. These products are primarily sold in the chew set with rawhide, yet may appear with treats or other products. Often, these products are mostly rawhide, including often 90% rawhide. An example of such a product is shown in FIG. 1H.

Other prior art jerky product are described in U.S. Pat. Nos. 5,673,653 and 6,584,938. U.S. Pat. No. 5,673,653 describes a chew toy in which jerky sheets are wrapped in a rawhide sheet by rolling or folding. U.S. Pat. No. 6,584,938 describes a chew toy which is formed into shape from a rawhide bit mixture of rawhide bits or pieces and a bonding agent or adherent.

SUMMARY

In some embodiments, a method of manufacturing pet treats comprises combining one or more unprocessed meats with one or more binding agents, wherein said one or more unprocessed meats are not extruded, ground, emulsified, liquefied, partially liquefied, or made into a powder, and forming the combination into a shape to form a pet treat.

In some embodiments, a pet treat comprises one or more unprocessed meats that have not been extruded, ground, emulsified, liquefied, partially liquefied, or made into a powder, and one or more binding agents, wherein the unprocessed meats and the binding agents are combined and formed into a shape to form the pet treat.

In some embodiments, a method of manufacturing a pet treat comprises storing an unprocessed meat in a frozen state; defrosting the unprocessed meat; drying the unprocessed meat to reduce its moisture content; forming the unprocessed meat into small pieces, wherein the unprocessed meat is not made into a powder, extruded, ground, emulsified, liquefied, or partially liquefied; combining the pieces of unprocessed meat with a binding agent; forming the combination into a shape to form a pet treat; and packaging the pet treat into a pet treat product.

In some embodiments, a pet treat comprises small pieces of unprocessed meat, wherein the pieces of unprocessed meat have not been made into a powder, extruded, ground, emulsified, liquefied, or partially liquefied; and one or more binding agents, wherein the binding agents comprise at least one of rice and seaweed; wherein the pieces of unprocessed meat and the binding agents are combined and formed into a shape to form the pet treat; and wherein the pet treat has a rough texture in which the individual pieces of the unprocessed meat are visible within the pet treat.

In some embodiments, a method of manufacturing pet treats comprises storing a first unprocessed meat and a second unprocessed meat frozen at a temperature below approximately −18° C.; defrosting the first and second unprocessed meats at a temperature between approximately 0-5° C.; mixing the first unprocessed meat with additives; drying the first unprocessed meat at a temperature between approximately 65-85° C. until the moisture content of said first unprocessed meat reaches approximately 25%; separating the first unprocessed meat into particles; drying the particles of first unprocessed meat at a temperature between approximately 55-60° C. until the moisture content of said particles of first unprocessed meat is approximately 12-14%; cutting the second unprocessed meat into pieces; selecting a binding agent; blending the particles of first unprocessed meat, the pieces of second unprocessed meat, and the binding agent; forming the blend into a shape to form a pet treat; drying the pet treat at any of one or more temperatures between approximately 55-72° C. until the moisture content of the pet treat is less than approximately 16%; conducting a test to detect metal in the pet treat; packaging the pet treat into a pet treat product; and irradiating the pet treat product to kill microorganisms.

In some embodiments, a method of manufacturing pet treats comprises storing an unprocessed meat in a frozen state; defrosting said unprocessed meat; drying said unprocessed meat to reduce its moisture content; forming said unprocessed meat into small pieces, wherein said unprocessed meat is not made into a powder, extruded, ground, emulsified, liquefied, or partially liquefied; combining said pieces of unprocessed meat with a binding agent; forming said combination into a shape to form a pet treat; and packaging said pet treat into a pet treat product.

In some embodiments, a pet treat comprises small pieces of unprocessed meat, wherein said pieces of unprocessed meat have not been made into a powder, extruded, ground, emulsified, liquefied, or partially liquefied; and one or more binding agents, wherein said one or more binding agents comprise at least one of rice and seaweed; wherein said pieces of unprocessed meat and said one or more binding agents are combined and formed into a shape to form said pet treat; and wherein the individual pieces of the unprocessed meat are visible within the pet treat.

In some embodiments, a pet treat product is prepared by a process comprising storing an unprocessed meat in a frozen state; defrosting said unprocessed meat; separating said unprocessed meat into pieces, wherein said unprocessed meat is not made into a powder, extruded, ground, emulsified, liquefied, or partially liquefied; combining said pieces of unprocessed meat with a binding agent; forming said combination into a shape to form a pet treat; baking said combination; and packaging said pet treat into a pet treat product.

In some embodiments, a pet treat product is prepared by a process comprising combining one or more unprocessed meats with one or more binding agents, wherein said one or more unprocessed meats are not extruded, ground, emulsified, liquefied, partially liquefied, or made into a powder; and forming said combination into a shape to form a pet treat.

DETAILED DESCRIPTION

Figure 1A:
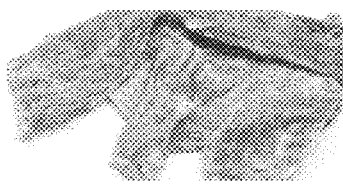
FIG. 1A illustrates a traditional processed pet treat product.
Figure 1B:
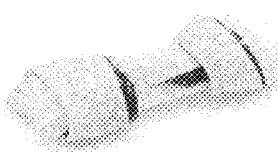
FIG. 1B illustrates another traditional processed pet treat product.
Figure 1C:
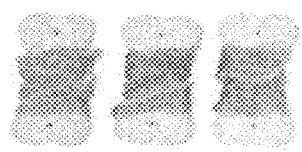
FIG. 1C illustrates another traditional processed pet treat product.
Figure 1D:
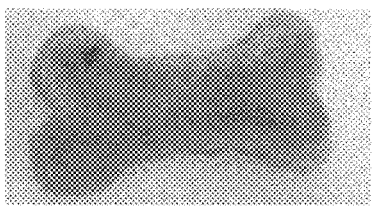
FIG. 1D illustrates another traditional processed pet treat product.
Figure 1E:
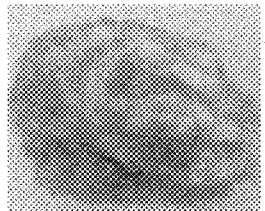
FIG. 1E illustrates another traditional processed pet treat product.
Figure 1F:
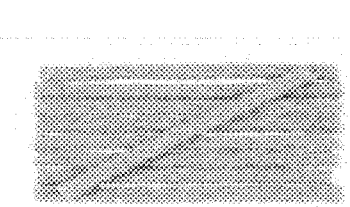
FIG. 1F illustrates another traditional processed pet treat product.
Figure 1G:
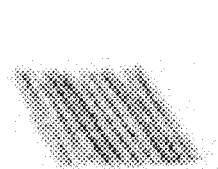
FIG. 1G illustrates another traditional processed pet treat product.
Figure 1H:
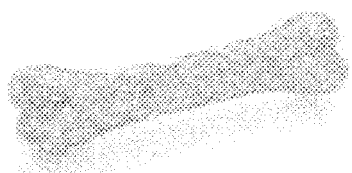
FIG. 1H illustrates another traditional processed pet treat product.

In some embodiments, pieces, bits, and/or parts of unprocessed meats, which are neither extruded, ground, emulsified, liquefied, partially liquefied, nor made into a powder, may be combined with natural and/or un-natural binding agents and may also be combined with natural and/or un-natural preservatives and formed into shapes in which the pieces, bits, and/or parts of the meat may, or may not, be visible within the production product, yet contained within. The meats may be fresh, frozen, partially defrosted, defrosted, and/or meat that has just been defrosted but has not yet been dried prior to combining with the other ingredients. The meats may also be dried, including via heat or baking, prior to combining, and still be considered unprocessed. The meats also may be baked after combining and still be considered unprocessed. The meats that may be combined in accordance with these and other embodiments include the meats of mammals (e.g., lamb, beef, swine, etc), birds (e.g., turkey, duck, chicken, etc), and/or fish (e.g., salmon, whitefish, trout, etc) origin. In a preferred embodiment, the meats comprise chicken.

By not processing the meats, including not extruding, grinding, emulsifying, liquefying, partially liquefying, or making into a powder, the meats retain more nutritional value and also may provide a rough texture where the individual meat bits in their unaltered state are visible within the product. In particular, the unprocessed meats may be of sufficient quantity to provide a preferably roughened texture to the product in which chunks of unprocessed meats are visible on the surface. In a preferred embodiment, the unprocessed meats comprise approximately 70-75% of the product. However, in other embodiments, including embodiments that include both processed and unprocessed meats, any quantity of unprocessed meats may be included so long as some unprocessed meats remain visible on the surface of the product and/or within the product. For example, a product that is comprised primarily of processed meats may be sprinkled with unprocessed meats such that the unprocessed meats are visible on the surface of the product. In addition, products may be made with a unique surface texture that is not functional but rather is used by consumers to identify the source of the products.

To be clear, breaking meats into bits or parts, or separating, breaking, or smashing meats into particles is not considered processing the meats provided that the meats are not made into powder. For example, meats may be separated into particles having a diameter of approximately 1/16" and not be considered as processed meats. Not processing the meats also may provide a product having more nutrients because they have not been heated to a point where nutrients break down and are lost.

In preferred embodiments, meats may be separated particles having a diameter of approximately 1/8" to 3/8". In other embodiments, meats may be separated into 2" pieces.

In preferred embodiments, the core of the pet treat product contains only unprocessed meats. However, in other embodiments, unprocessed meats may be combined with processed meats in the core of the pet treat product. In a preferred embodiment, the pet treat product has over 50% simple unprocessed meats that are dried, fresh, frozen, partially defrosted, defrosted, and/or meat that has just been defrosted but has not yet been dried. While it is desirable to include over 50% simple unprocessed meats for nutrition and palatability reasons and to provide an anthropomorphic benefit (i.e., appearing more like food for humans), any amount of unprocessed meat may be included, including amounts less than 50%. Furthermore, in other embodiments, the product may be comprised of 70%, 80% or 90% or more of unprocessed meat.

Various meals may be used from mammals, birds, and/or fish to form the product. However, in preferred embodiments, the hide or skin of mammals, birds, and/or fish is not used in the product.

Various binding agents, natural and/or un-natural, may be used to produce the product and hold it together. The binding agent, or filler, may be anything that is added that helps give the product shape. In some embodiments, rice and/or seaweed, including carrageenan, is combined with chicken. Rice and/or seaweed may be combined as a binding agent with meat bits that are dried, fresh, frozen, partially defrosted, defrosted, and/or meat that has just been defrosted but not yet dried. In a preferred embodiment, a natural binding agent, such as carrageenan, is used as a binding agent. Adding rice and/or seaweed to meat bits may allow for a hard shape to be formed in any chosen shape. In addition, adding rice and/or seaweed, including carrageenan, may allow processing such as emulsification, grinding, making into a powder, liquefaction, and partial liquefaction to be avoided, thereby avoiding the loss of protein and other nutritional value. Other binding agents that may be used include corn and gluten. The binding agent may also be an animal-based product. To be clear, the addition of a binding agent is not considered processing a meat, regardless of when the binding agent is added.

In some embodiments, the need for a preservative may be eliminated. For example, the product may be irradiated to kill all microorganisms. Also, the product may be hermetically sealed in a package. Packaging and sealing the pet treat product avoids exposure to air, which sometimes may cause a product to become brittle. In other embodiments, the pet treat product includes a preservative. For example, vegetable glycerin may be used as a preservative. To be clear, the addition of a preservative is not considered processing a meat, regardless of when the preservative is added.

The pet treat product may vary according to the type of muscle fiber of the meat used. For example, in embodiments in which the meat used is chicken, chicken with more muscle fiber may be used to form stronger shapes. In alternative embodiments, chicken with less muscle fiber may be used.

Figure 2A:
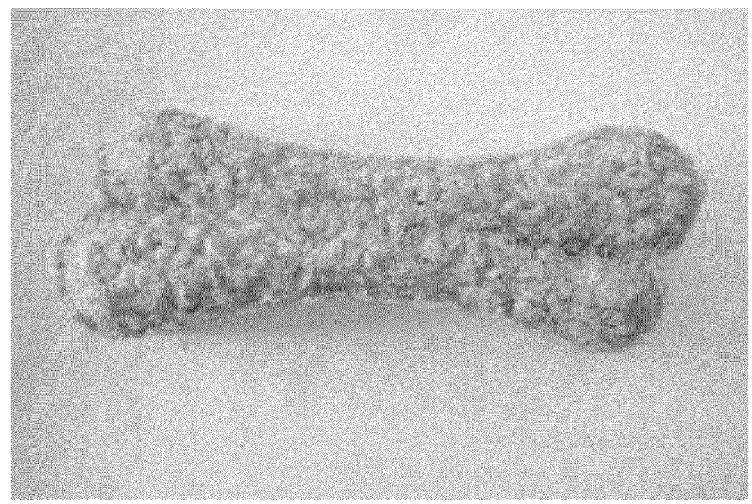
FIG. 2A illustrates an embodiment of a pet treat product that is pressed.
Figure 2B:
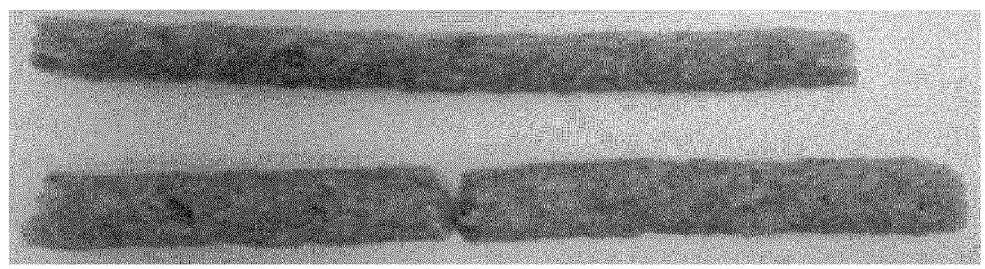
FIG. 2B illustrates an embodiment of a pet treat product that is extruded.

The shape of the pet treat product may be made using various manufacturing processes. For example, the shape of the pet treat product may be made by pressing the product, and the shape also may be made by extruding the product. To be clear, the shape may be made by pressing or extruding the product so long as pressing or extruding does not substantially alter the physical appearance of the unprocessed meats contained within the product. An example of a pet treat product of a particular embodiment made by pressing the product is shown in FIG. 2A. An example of a pet treat product of a particular embodiment made by extruding the product is shown in FIG. 2B. In addition, the shape of the pet treat product may be made with other manufacturing processes. Products may be made into unique shapes that are not functional but rather are used by consumers to identify the source of the products.

The products may be marketed or sold as either treats or chews for pets, including dogs, cats, horses, rabbits, rodents and other animals. In some embodiments, the product may be produced with an all-natural claim if warranted by its ingredients.

For any embodiment, the base shapes may optionally be coated with various ingredients. For example, the coating ingredients may include, but are not limited to, emulsified, ground, liquefied, partially liquefied, powdered, and processed meats. The coating ingredients also may include vitamins, minerals, antioxidants, and supplements, including, but not limited to, glucosamine and chondroitin. Adding coatings may increase the smoothness of the product texture. Alternatively, in some embodiments, an ingredient coating may be added to a base shape, but the product may retain a textured feel.

In one embodiment, pieces of chicken, which may be dried, fresh, frozen, partially defrosted, defrosted, and/or chicken that has just been defrosted but not yet dried, are combined using rice or seaweed as a binding agent. Without adding preservatives, the pieces may be formed into shapes. These shapes may then be coated with various ingredients, including emulsified, ground, liquefied, partially liquefied, powdered, and processed meats.

The exterior appearance of the products may be unique and nonfunctional. Thus, consumers may be able to identify the source of the products by the exterior surface texture and/or appearance of the products. Likewise, products may be formed into unique nonfunctional shapes.

Figure 3:
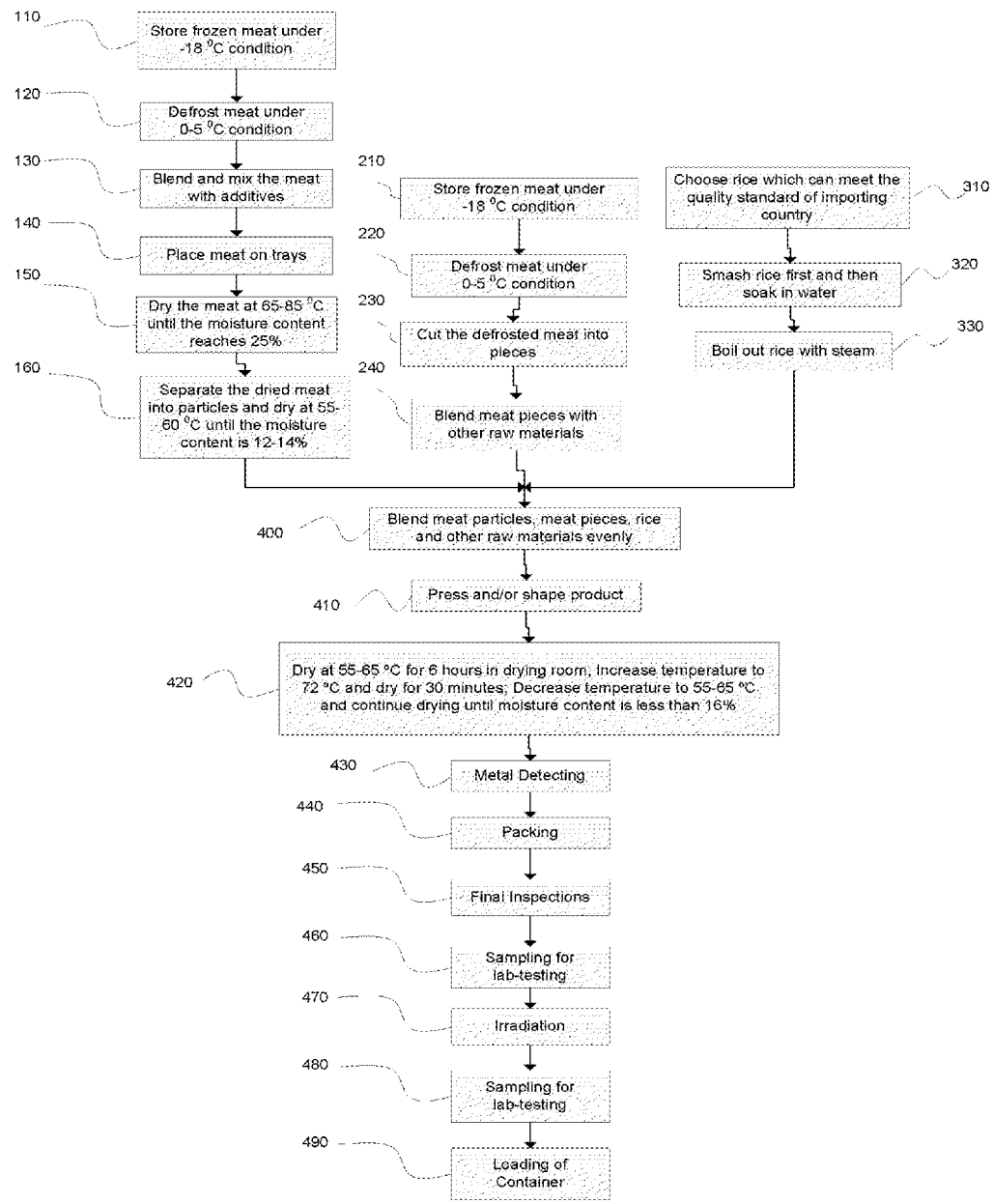
FIG. 3 is a flowchart illustrating an embodiment of a method of manufacturing a pet treat product.

A flowchart illustrating an exemplary formed jerky treat manufacturing process of particular embodiments is shown in FIG. 3. In step 110, a first meat may be frozen under −18° C. The first meat may be of mammals (e.g., lamb, beef, swine, etc), birds (e.g., turkey, duck, chicken, etc), and/or fish (e.g., salmon, whitefish, trout, etc) origin, or any combination thereof. In step 120, the first meat may be defrosted to approximately 0-5° C. In step 130, the defrosted first meat may be blended and mixed with additives. The first meat then may be placed on trays in step 140. In step 150, the meat may be dried and/or baked at approximately 65-85° C. until the moisture content reaches approximately 25%. In step 160, the meat may be separated into particles and dried and/or baked at 55-60° C. until the moisture content is approximately 12-14%. It should be appreciated, however, that in alternative embodiments the drying or baking in steps 150 and 160 may be reduced or omitted. Similarly, in alternative embodiments, step 130 may be omitted.

In step 210, a second meat may be frozen under −18° C. The second meat may be of mammals (e.g., lamb, beef, swine, etc), birds (e.g., turkey, duck, chicken, etc), and/or fish (e.g., salmon, whitefish, trout, etc) origin, or any combination thereof. The first and second meats may be the same or different. In step 220, the second meat may be defrosted to approximately 0-5° C. In step 230, the second meat may be cut into pieces. Then, in step 240, the pieces of the second meat may be blended with other raw materials.

In step 310, a rice may be selected which can meet the quality standards of the importing country. In alternative embodiments, other binding agents, such as seaweed, may be used in addition to or in place of rice. In step 320, the rice may be smashed and then soaked in water, and in step 330, the rice may be boiled out with steam.

In step 400, the particles of the first meat, the pieces of the second meat, the rice, and other raw materials may be blended evenly. FIG. 1 illustrates embodiments in which particles of a first meat and pieces of a second meat are blended together. In other embodiments, particles of a first meat and particles of a second meat may be blended together. Alternatively, pieces of a first meat and pieces of a second meat may be blended together. It should further be appreciated that in some embodiments the first meat or the second meat may be omitted, such that only the particles of the first meat or the pieces of the second meat would be blended in step 400. In yet other embodiments, additional meats, such as a third meat, fourth meat, or more, may be blended in step 400. These additional meats may be in the form of pieces, bits, and/or parts.

In step 410, the blend may be pressed and/or shaped into a product. The shapes may be unique and are typically not functional. The shapes may be used by consumers to identify the source of the products.

In step 420, the product may be dried and/or baked at 55-65° C. for 6 hours in a drying room, then may be dried and/or baked at 72° C. for 30 minutes, then may be dried and/or baked again at 55-65° C. until moisture content is less than 16%. In other embodiments, the temperature ranges and durations may vary significantly. For example, in some embodiments, the product may be heated and/or baked as high as 80° C. or higher.

In step 430, a metal detection test may be conducted to detect any metal in the product. Then, in step 440 the product may be packed. Final product inspections may be conducted in step 450. In some embodiments, 2.5% of products undergo final inspections. Other embodiments include fewer or no final inspections, whereas some alternative embodiments include more. In step 460, the product may be sampled for lab-testing. For example, in some embodiments five products may be sampled for lab-testing per SKU per batch. In step 470, the product may be irradiated to kill all microorganisms. For example, the product may be irradiated at 7 kgy min. In step 480, products that have been irradiated may be sampled for lab testing. For example, in some embodiments three products may be sampled for lab-testing per SKU per batch. Lastly, in step 490, the products may be loaded into a container for transport.

The foregoing description details certain embodiments of the invention. It will be appreciated, however, that no matter how detailed the foregoing appears in text, the invention can be practiced in many ways. These embodiments are disclosed by way of examples only and are not to limit the scope of the disclosure. One of ordinary skill in the art will appreciate the many variations, modifications, and combinations. For example, particular ingredients may be deleted or other ingredients may be added and still fall within the scope of the present invention.

What is claimed is:

1. A method of manufacturing pet treats comprising:
   forming unprocessed meat into pieces from one or more unprocessed meats, wherein the pieces of unprocessed meat are not extruded, ground, emulsified, liquefied, partially liquefied, or made into a powder;
   combining the pieces of unprocessed meat with one or more binding agents selected from the group consisting of rice, corn and carrageenan to form a blend of the pieces of unprocessed meat and the one or more binding agents; and
   extruding the blend into shapes to form the pet treats, each of the pet treats comprising a plurality of the pieces of unprocessed meat held together by the one or more binding agents, in each of the pet treats at least a portion of the pieces of unprocessed meat are individually visible within the pet treat, and the one or more unprocessed meats are at least 80 wt. % of each of the pet treats.

2. The method of claim 1, further comprising baking the pet treats.

3. The method of claim 1, further comprising irradiating the pet treats to kill microorganisms.

4. The method of claim 1, wherein the pieces of unprocessed meat and the one or more binding agents are further combined with a preservative.

5. The method of claim 4, wherein the preservative is vegetable glycerin.

6. The method of claim 1, wherein said one or more unprocessed meats comprise chicken.

7. The method of claim 1, wherein the pieces of unprocessed meat and the one or more binding agents are further combined with processed meats that have been extruded, ground, emulsified, liquefied, partially liquefied, or made into a powder.

8. The method of claim 1, wherein said one or more unprocessed meats comprises substantially all of the meat of the pet treat.

9. The method of claim 1, wherein said one or more binding agents comprise carrageenan.

10. The method of claim 1, further comprising coating each of said shapes with one or more ingredients.

11. The method of claim 10, wherein said one or more ingredients comprise processed meats.

12. The method of claim 1, wherein at least one of the one or more unprocessed meats is fresh when formed into the pieces and when the pieces are combined with the one or more binding agents.

13. The method of claim 1, wherein at least one of the one or more unprocessed meats is frozen when formed into the pieces and when the pieces are combined with the one or more binding agents.

14. The method of claim 1, wherein at least one of the one or more unprocessed meats is partially defrosted when formed into the pieces and when the pieces are combined with the one or more binding agents.

15. The method of claim 1, wherein at least one of the one or more unprocessed meats is defrosted when formed into the pieces and when the pieces are combined with the one or more binding agents.

16. The method of claim 1, wherein at least one of the one or more unprocessed meats is defrosted but has not been dried when formed into the pieces and when the pieces are combined with the one or more binding agents.

17. The method of claim 1, wherein the pieces of meat have been dried prior to the combining with the one or more binding agents.

18. The method of claim 1, wherein the one or more unprocessed meats are at least 90% of each of the pet treats by weight.

19. The method of claim 1, wherein the one or more binding agents comprise rice.

20. The method of claim 1, wherein the one or more binding agents comprise corn.

21. The method of claim 1, wherein the one or more binding agents further comprise gluten.

* * * * *